(12) United States Patent
Snover et al.

(10) Patent No.: US 8,566,806 B2
(45) Date of Patent: Oct. 22, 2013

(54) COMMAND-LINE DATA-TYPE DISCOVERY AND CONVERSION

(75) Inventors: Jeffrey P. Snover, Woodinville, WA (US); Jeffrey D. Jones, Redmond, WA (US); Hitesh Raigandhi, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 2129 days.

(21) Appl. No.: 11/072,095

(22) Filed: Mar. 4, 2005

(65) Prior Publication Data

US 2006/0197967 A1 Sep. 7, 2006

(51) Int. Cl.
*G06F 9/45* (2006.01)

(52) U.S. Cl.
USPC .......................................................... 717/136

(58) Field of Classification Search
USPC .......................................................... 717/136
See application file for complete search history.

(56) References Cited

U.S. PATENT DOCUMENTS

| 5,987,504 | A  | * | 11/1999 | Toga ............................ 709/206 |
| 7,290,012 | B2 | * | 10/2007 | Charlet et al. ........................ 1/1 |
| 7,587,670 | B2 | * | 9/2009  | Snover et al. ................. 715/243 |
| 7,594,170 | B2 | * | 9/2009  | Snover et al. ................. 715/243 |
| 2005/0091586 | A1 | | 4/2005 | Snover et al. |

FOREIGN PATENT DOCUMENTS

| JP | 11259304    | 9/1999  |
| JP | 2002351709  | 12/2002 |
| JP | 200413578   | 1/2004  |
| JP | 2004342107  | 12/2004 |
| JP | 2004342108  | 12/2004 |
| WO | WO2005045570 | 5/2005 |

OTHER PUBLICATIONS

Wim Taymans, Steve Baker, Andy Wingo, GStreamer Application Development Manual (0.7.5), Feb. 26, 2004.*
Debargha Mukherjee, Amir Said, Structured Scalable Meta-formats (SSM) for Digital Item Adaptation, Jan. 2003, Proceedings of the SPIE, vol. 5018.*
Hartmann, J.P., "CMS Pipelines Explained", Proceedings. SHARE Europe Spring Meeting: Managing Communications in a Global Marketplace, 1992, p. 285-320. Publisher: SHARE Europe (SEAS), Geneva, Switzerland.*
Hartmann-J-P. "How CMS got its plumbing fixed.", Proceedings SHARE Europe Spring Meeting, 1990, p. 175-186. Publisher: SHARE Europe (SEAS), Geneva, Switzerland.*
"Plunging into Pipes", Melinda Varian, Proceedings. SHARE Europe Anniversary Meeting, 1991, p. 1087-1110. Publisher: SHARE Europe (SEAS), Geneva, Switzerland.*
"Cramming for the Journeyman Plumber Exam; Part III: Dynamic Reconfiguration in CMS Pipelines", revised Mar. 1, 1999, available from http://vm.marist.edu/~pipeline.*
Chuck Boeheim, "Pipelines Programming Paradigms: Prefab Plumbing", presented at SHARE 77, Chicago, Il, Aug. 19-23, 1999.*

(Continued)

*Primary Examiner* — John Chavis
(74) *Attorney, Agent, or Firm* — Lee & Hayes, PLLC

(57) ABSTRACT

Systems and/or methods are presented that may be used to enable operation of a command line having an upstream command and a downstream command where the upstream command may output data of a type that may be unacceptable as input to the downstream command.

8 Claims, 3 Drawing Sheets

(56) References Cited

OTHER PUBLICATIONS

Delaglio F, Grzesiek S, Vuister GW, Zhu G, Pfeifer J, Bax A., "NMRPipe: a multidimensional spectral processing system based on UNIX pipes.", Springer Netherlands, Journal of Biomolecular NMR, vol. 6, No. 3, Nov. 1995, pp. 277-293.*

"GStreamer News", retrieved on Sep. 27, 2007, at <<http://gstreamer.freedesktop.org/news/>>, pp. 12

The European Office Action mailed Nov. 3, 2011 for European patent application No. 06101696.0, a counterpart foreign application of U.S. Appl. No. 11/072,095, 5 pages.

Translated Japanese Office Action mailed Sep. 6, 2011 for Japanese patent application No. 2006-024863, a counterpart foreign application of U.S. Appl. No. 11/072,095, 3 pages.

Boulton et al., "GStreamer Plugin Writer's Guide (0.8.5.1)", Oct. 6, 2004, 68 pages.

Taymans, et al., "Gstreamer Application Development Manual (0.8.5.1)", Oct. 6, 2004, 90 pages.

* cited by examiner

COMMAND-LINE DATA-TYPE DISCOVERY AND CONVERSION

TECHNICAL FIELD

This invention relates to command lines and command-line interfaces.

BACKGROUND

Computer users commonly need to find and use information. Often they may find and use information through a graphical user interface or a command line interface. If a user wants to find a color printer near his office and configure that printer, for example, he may be able to do so through menus, drop-down lists, and the like in a graphical user interface or through entry of command lines in a command line interface.

Assume that the user selects to find and configure a color printer through a graphical user interface. If his company has 127 printers distributed though ten buildings, for instance, a drop down list of available printers may show each of these 127 printers. By reading through properties for each of these listed printers, the user determines that eighteen of these printers can print in color and that one of these eighteen is located in his building. Armed with the name of this color printer, the user may then choose to configure the printer, such as through a graphical user interface. Once complete, the user can send color print jobs to this printer.

In many situations a command line interface permits a user to find and use information with greater speed, efficiency, or power than a graphical user interface. In the above example, the user studies properties for 127 printers to find the one he wants. That may take considerable time.

Assume instead that the user finds and configures the color printer through a command line interface. A user often has two options in a situation like this. In the first, he enters a first command line (e.g., "get_printer"), reads its output, finds the printer he is looking for, and types another command line with the found information as input to the second command (e.g., "Configure-Printer printername"). This has various problems. One is that the user needs to be able to read and understand the output of the first command. This often means that the first command line outputs TEXT-encoded data (which is human readable) with a particular format and that the user has to read through it. It also means that the user has to enter a second command and enter the found information in a format and encoding usable by the second command. In many cases, this first option may also take considerable time.

In the second option, a command line interface, often through its "shell", automates much of the user's actions with a script. In this case, a user enters a command line comprising the first and second commands (and a new third command) and other information that, in total, is used to find the printer and configure it. In this case, the command line might read:

```
$x=get_printer | get_printername 9 color
| Configure-Printer $x
```

Here the user wrote a script which invokes the first command "get_printer" to get information on all the printers. It then parses the output based on which printers are in building number 9 that print in color ("get_printername 9 color"). Once the name of this printer is found, the shell invokes the command "Configure-Printer" with this printer's name, thereby configuring that printer.

While this second option may be powerful and efficient, it also has a problem. Commands are type-specific; they generally accept and output data in a particular type (e.g., encoded and formatted in XML). If the first command "get_printer" generates TEXT-encoded and formatted data but the "Configure-Printer" command does not accept TEXT-encoded and formatted data exactly, the Configure-Printer command will fail.

To address this problem, many creators of commands for command lines have standardized them to output data and accept input data only when it is TEXT-encoded. But TEXT-encoded data can be difficult to parse and/or parsing it can be prone to error since there is no standard format.

SUMMARY

Systems and/or methods are presented that may be used to enable operation of a command line having an upstream command and a downstream command in which an upstream command outputs data of a type that may be unacceptable as input to the downstream command.

The systems and/or methods may comprise, for example, a command-line data-stream protocol in which output from an upstream command in a command line is received having a tag sufficient to enable a determination of a data type associated with the output. By knowing the data type, the associated data may be converted to a data type that is acceptable as input to a downstream command.

DETAILED DESCRIPTION

Overview

Systems and/or methods ("tools") are presented that may be used to enable operation of a command line having an upstream command and a downstream command where the upstream command outputs data of a type unacceptable as input to the downstream command.

In an illustrated embodiment, a command-line data-stream protocol receives output from an upstream command in a command line. The received output has a tag that is sufficient to enable the output's data type to be determined. An acceptable data type of a downstream command in the command line into which the output is to be received as input is also determined. If the output's data type is not compatible with the downstream command's data type, the output's data type is converted to a compatible data type for the downstream command.

In another illustrated embodiment, a command-line shell determines types of data that may be output by an upstream command and types of data acceptable as input by a downstream command. If one of the types of data that may be output is acceptable as input to the downstream command, the shell directs the upstream command to output its data with this type. If, on the other hand, the command-line shell determines that none of the types of data that may be output are acceptable as input to the downstream command, the command-line shell may direct the upstream command to output the data with a type convertible to one of the types of data acceptable as input. The shell may then invoke a conversion command to convert the data type of the output to be one acceptable as input.

In still another illustrated embodiment, output from a command is encoded to comprise a tag. This tag may comprise a preamble to the data output containing information sufficient to enable determination of the output's data type, such as it being structured data like Comma Separated Values (CSV) or eXtensible Markup Language (XML) having a particular schema.

Exemplary Architecture

Before describing aspects of the tools in detail, the following discussion of an exemplary architecture is provided to assist the reader in understanding where and how various aspects of the tools may be employed. It is to be understood that the description provided below constitutes but one example and is not intended to limit application of the tools to one particular architecture or environment.

Figure 1:
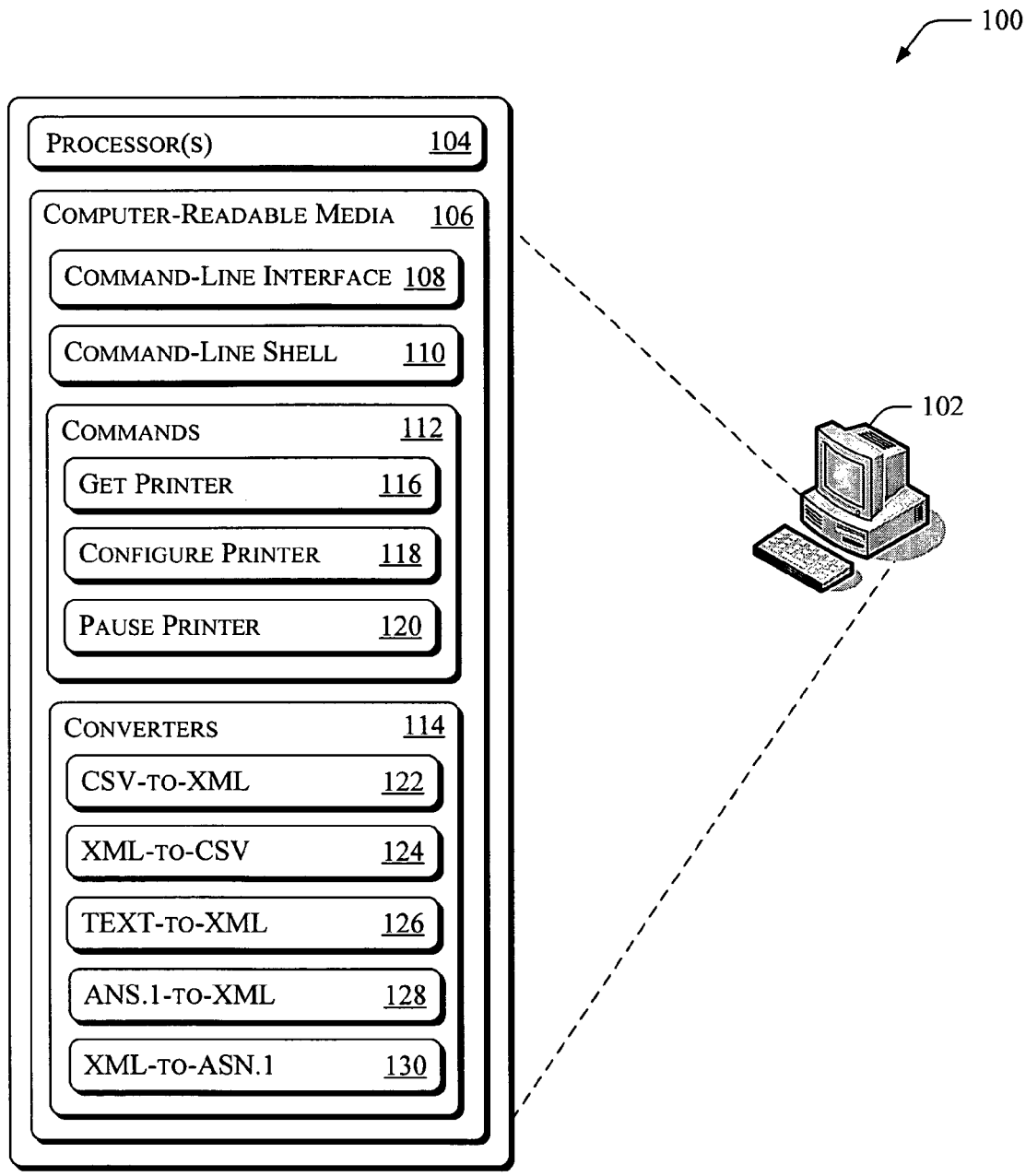
FIG. 1 illustrates an exemplary architecture in which various embodiments of the tools may operate.

FIG. 1 shows an architecture generally at 100 comprising a computing device 102 and various components within or accessible by the computing device. In this particular example, the computing device comprises one or more processors 104 and computer-readable media 106. The computer-readable media embodies software code that provides a command-line interface 108, a command-line shell 110, commands 112, and converters 114.

A plurality of commands 110 are shown having various potential input and output types. For example, a get printer command 116 is capable of accepting and outputting data of TEXT and CSV types, a configure printer command 118 is capable of accepting and outputting CSV and XML types, and a pause printer command 120 is capable of accepting and outputting ASN.1 and XML types.

A plurality of converters 114 are also shown and are capable of converting output of one or more of commands 112 from one data type to another, such as a CSV-to-XML converter 122, an XML-to-CSV converter 124, a TEXT-to-XML converter 126, an ASN.1-to-XML converter 128, and an XML-to-ASN.1 converter 130.

As will be described in more detail below, the command-line interface receives a command line entry, such as one entered by a user of the computing device, and performs or otherwise executes associated commands. The command-line shell manages commands in the command line, such as by creating processes for each command within the command line and managing input and output between the processes for these commands.

Enabling Operation of Command Lines

The tools described above and below can enable operation of command lines having an upstream command and a downstream command in which the upstream command may output data of a type unacceptable as input to the downstream command. In some illustrated embodiments described below, the tools do so through an encoding and conversion protocol. The conversion aspect of the protocol may be invoked within the command line itself or externally, such as by the command-line shell. In another illustrated embodiment, the tools enable operation without an encoding and conversion protocol.

These embodiments may be used singly or in combination. Thus, a command line may have a conversion invoked within the command line for one upstream-downstream pair, another conversion invoked by the shell for a second upstream-downstream pair, and input to a downstream command made acceptable automatically by detecting and directing the upstream command's output for a third upstream-downstream pair.

These various embodiments are described for illustration purposes and are not intended to limit the applicability of the tools.

Encoding and Conversion Protocol; Conversion Externally Invoked

Figure 2:
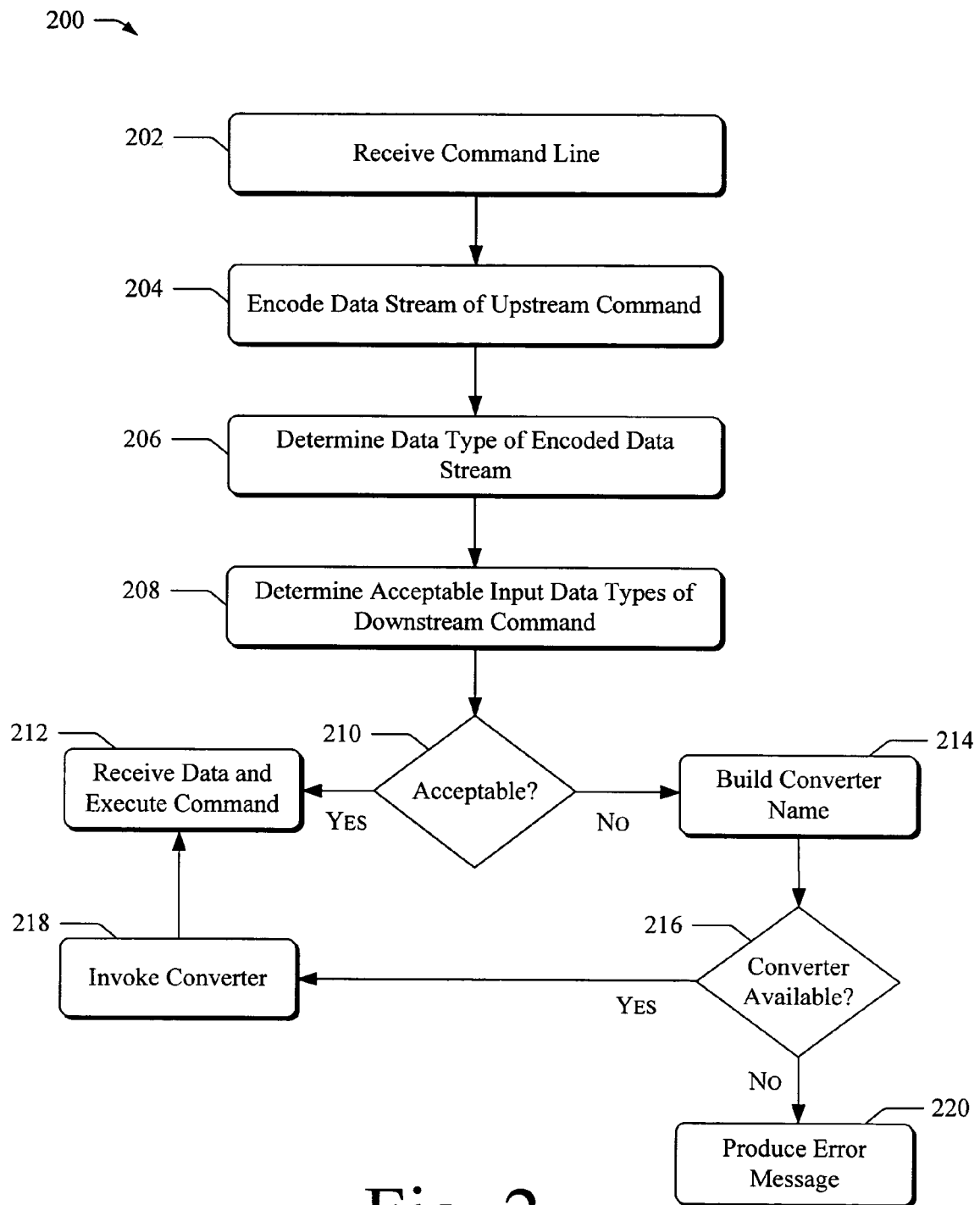
FIG. 2 sets forth a flow diagram of an exemplary process having an exemplary protocol for enabling operation of a command line.
Figure 3:
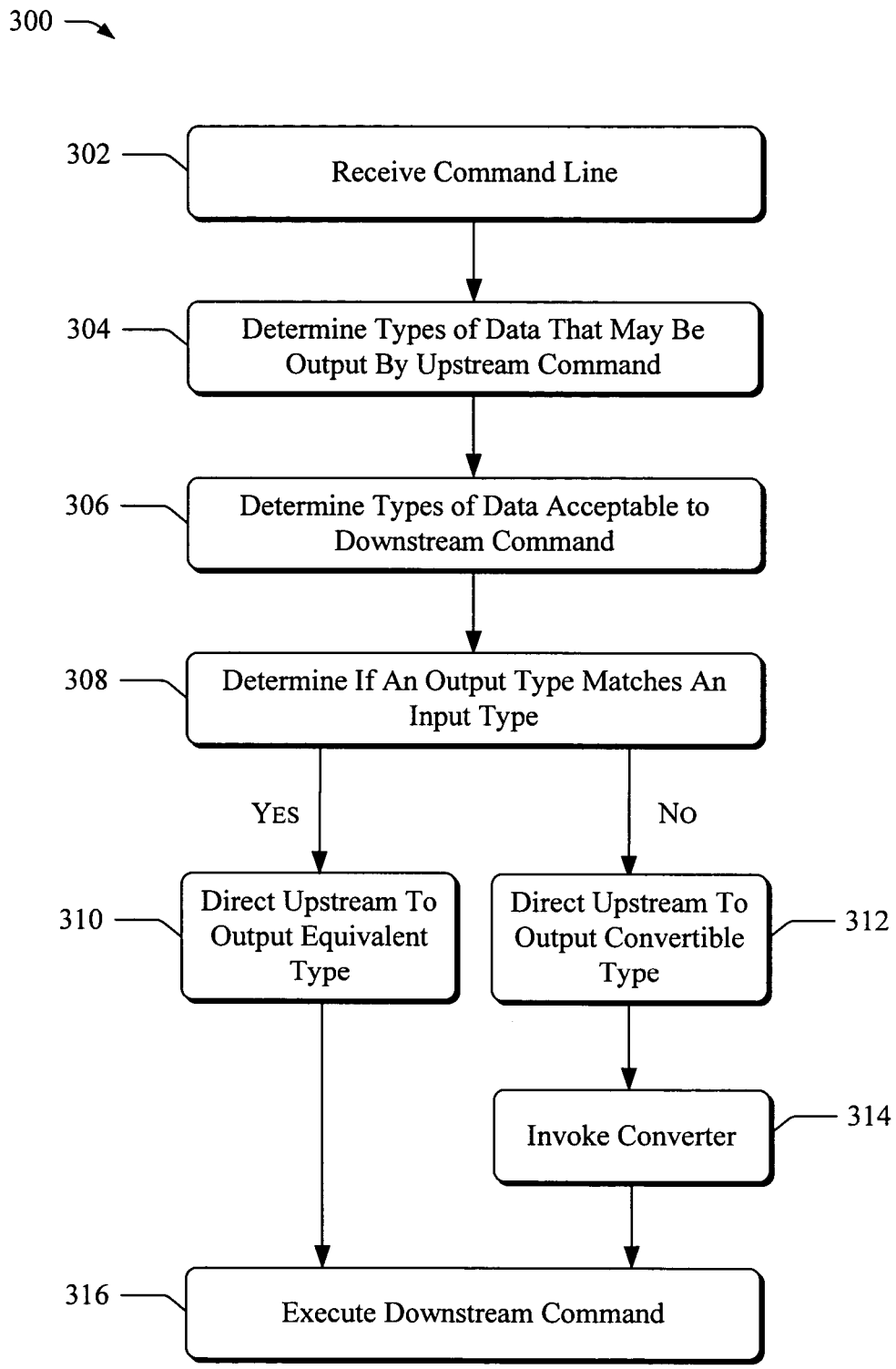
FIG. 3 sets forth a flow diagram of an exemplary process for enabling operation of a command line through determination and direction of an upstream command's data type.

Referring to FIG. 2, a process 200 has an exemplary encoding and conversion protocol in which the conversion is externally invoked. The process 200 is illustrated as a series of blocks representing individual operations or acts performed by elements of the computing device, such as command-line interface 108, command-line shell 110, and converters 114. This and other processes described herein may be implemented in connection with any suitable hardware, software, firmware, or combination thereof. In the case of software and firmware, these processes represent sets of operations implemented as computer-executable instructions.

At block 202, a command line is received. This command line may be received from a user of computing device 102, such as from a user who types a command line into command-line interface 108. The command line may comprise multiple commands, such as one or more upstream commands and one or more downstream commands.

In an illustrated embodiment, a command line is received having the following syntax:

$ GET-PRINTER-SystemName PRINTSRV10|PAUSE-PRINTER

In this example, the command line has an upstream command of "GET-PRINTER" and a downstream command of "PAUSE-PRINTER". These commands are shown in FIG. 1 at 116 and 120. This command line requests data for the printer(s) that are accessible by the computing device having the system name of "PRINTSRV10". In addition, this command requests that the printer(s) be paused. To execute this command line, the output of the upstream command (the data for the "PRINTERSRV10" printers) may, if possible, be piped to the pause printer command as input.

Assume, however, that the default type of output of the get printer command is Comma Separated Values (CSV). Assume also that the pause printer command accepts only ASN.1 (Abstract Syntax Notation One) or XML-type (extensible Markup Language-type) input. In this case, the upstream command outputs data having a type that is unacceptable as input to a downstream command.

Assume now that the output of the upstream command ("GET_PRINTER") is as follows:

USA/REDMOND,
WA/40/FLOOR2/2015,\\PRINTSRV10\b40-2015-a,0,3,b40-2015-a,\\PRINTSRV10
USA/REDMOND,
WA/40/FLOOR3/3015,\\PRINTSRV10\b40-3015-b,0,3,b40-3015-b,\\PRINTSRV10
USA/REDMOND,
WA/40/FLOOR4/4015,\\PRINTSRV10\b40-4015-b,0,3,b40-4015-b,\\PRINTSRV10
USA/REDMOND,
WA/40/FLOOR5/5015,\\PRINTSRV10\b40-5015-a,0,3,b40-5015-a,\\PRINTSRV10
USA/REDMOND,
WA/40/FLOOR6/6015,\\PRINTSRV10\b40-6015-a,0,3,b40-6015-a,\\PRINTSRV10
USA/REDMOND,
WA/44/FLOOR2/2662,\\PRINTSRV10\b44-2662-a,0,3,b44-2662-a,\\PRINTSRV10

Here, the get printer command found six printers with a system name of "PRINTSRV10" and produced this output in CSV format. If this CSV-type data is fed to the downstream pause printer command, the pause printer command will not accept this data, causing the command line to fail. Encoding and conversion protocols illustrated below, however, may be used to enable the operation of the command line even though the pause printer command does not accept CSV formats.

At block 204, the output of the upstream command is encoded with information sufficient to enable determination of the type of the data output, such as it being CSV or XML. This encoding is within the data stream of the output itself, such as with a data stream tag. In one embodiment, the data stream tag comprises a preamble to the data. This preamble may comprise information indicating the type of data and other information about the data, like a schema governing the data and the like.

With this preamble, the encoded output of the upstream get printer command will instead be as follows:

```
#< CSV
#ColumnNames:
Location,Name,PrinterState,PrinterStatus,ShareName,
SystemName
ColumnTypes:
String,String,int,int,String,String

USA/REDMOND,
WA/40/FLOOR2/2015,\\PRINTSRV10\b40-2015-
a,0,3,b40-2015-a,\\PRINTSRV10
USA/REDMOND,
WA/40/FLOOR3/3015,\\PRINTSRV10\b40-3015-
b,0,3,b40-3015-b,\\PRINTSRV10
USA/REDMOND,
WA/40/FLOOR4/4015,\\PRINTSRV10\b40-4015-
b,0,3,b40-4015-b,\\PRINTSRV10
USA/REDMOND,
WA/40/FLOOR5/5015,\\PRINTSRV10\b40-5015-
a,0,3,b40-5015-a,\\PRINTSRV10
USA/REDMOND,
WA/40/FLOOR6/6015,\\PRINTSRV10\b40-6015-
a,0,3,b40-6015-a,\\PRINTSRV10
USA/REDMOND,
WA/44/FLOOR2/2662,\\PRINTSRV10\b44-2662-
a,0,3,b44-2662-a,\\PRINTSRV10
```

This encoding may be performed in various ways. In one case, the upstream command is built or altered such that it automatically encodes its output. In another case, the shell receives the output and then encodes that output.

In many cases the command-line shell manages the commands in the command line, such as by breaking the command line into processes for each command and then acting to manage these processes. The shell may, for instance, send the output of each upstream command to a following downstream as input.

For the illustrated embodiment, assume that the output is encoded by the upstream command to comprise the above preamble. This preamble has four lines starting with a number sign ("#"). Each of these lines may comprise information about the data, though it may not necessarily comprise output data itself. The first line of the preamble comprises a number sign followed by a greater-than symbol and a space ("#> "). This three-character syntax indicates to a reader of the output that the next information in this line indicates the data type of the output. Thus, in this illustrated example, the next characters "CSV" indicate that the output is of the comma-separated-value type. The other three lines may also indicate additional information about the data. The second line is:

```
#ColumnNames:
Location,Name,PrinterState,PrinterStatus,ShareName,
SystemName
```

This line indicates that the structure of the CSV data is such that the first column is a printer's location, the second a printer's name, the third a printer's state, the fourth a printer's status, the fifth a share name for the printer, and the sixth a system name of the printer. Looking at the first line of output, this is shown with:

```
USA/REDMOND,
WA/40/FLOOR2/2015,\\PRINTSRV10\b40-2015-
a,0,3,b40-2015-a,\\PRINTSRV10
```

Thus, the location for the first-listed printer, which is in the first column of the first line, is "USA/REDMOND,WA/40/FLOOR2/2015". The name is "PRINTSRV10\b40-2015-a". This printer's state is "0", status is "3", and share name is "b40-2015-a". Lastly, this printer's system name is "PRINTSRV10".

The third of the four lines is:

```
#ColumnTypes:
String,String,int,int,String,String
```

This line indicates that the character types in the columns are strings or integers. This can be useful when determining how to handle this data and is another example of information about the output of the upstream command. Looking at the first line of output, this is shown with:

```
USA/REDMOND,
WA/40/FLOOR2/2015,\\PRINTSRV10\b40-2015-
a,0,3,b40-2015-a,\\PRINTSRV10
```

The columns have characters that are, as indicated in the preamble, filled with strings, strings, integer(s), integer(s), strings, and strings for columns one through six, respectively.

The fourth line is blank following a number sign, though it may contain additional information in some embodiments. The fifth line is blank and does not have a number sign character to start. This indicates that the next line is data, rather than information about that data.

At block 206 the method determines the data type of the encoded data. In some embodiments, the downstream command receiving the data and/or the shell may determine the data type of the encoded data, such as its encoding schema, for instance. Here the type of data is determined by reading the first line of the preamble of the encoded data. This line indicates that the data's data type is CSV. Other information may also be read to determine additional information about the output, here what information is in each column and the types of characters in those columns.

Continuing the illustrated embodiment, the downstream command and/or the shell are now aware of the data type of the data intended to be sent to the downstream command as input.

At block 208, acceptable data type(s) of the downstream command are determined. In some cases this is done intrinsically, such as when the downstream command receives the data from the upstream command and compares the data type of that data with what it accepts. The shell may also determine this, such as by comparing the downstream command with a database listing acceptable types of input to commands.

If the data type of the upstream command's output is acceptable to the downstream command, the downstream command receives the data and executes at block 212. This is shown with the "Yes" path following decision block 210 to block 212. If the data type is not acceptable to the downstream command, the shell or downstream command proceeds along the "No" path to block 214 or, in some cases, skips block 214 and proceeds to block 216.

In one embodiment, the shell may determine if a converter is available at block 216 that can convert the upstream data's data type to one accessible by the downstream command and invoke that converter at block 218, thereby skipping from block 210 to block 216. Alternatively, if a converter is not available, it can produce an error message at block 220. When invoking the converter the shell may pass the output of the upstream command to the converter as input and take the output of the converter and pass it to the downstream command.

The converters may also be invokable with names or indicators buildable by the downstream command. The downstream command may, for instance, take the name of a data type in the preamble, such as "CSV", and build a command to invoke a converter with this data type name and a name for a type acceptable to it.

In the illustrated embodiment, the downstream command has determined that the upstream command's data is output in CSV. It also knows that it can accept ASN.1 or XML. Thus, it may build a command at block 214 of either:

$ CONVERT CSV TO XML or $ CONVERT CSV TO ASN.1

It may follow a particular convention for building this converter's name so that the converters having these names match up. In this case the convention is to start with "CONVERT", follow that with a space " ", then the name of the type to be converted "CSV", follow that with a space " ", then a "TO", then a space " ", and then the name of the type desired "XML" or "ANS.1".

The downstream command or the shell may determine that either of these converters are available at block 216. If one of them is available the downstream command proceeds along the "Yes" path to block 218 to invoke the converter as mentioned above. If neither are available the downstream command or shell proceeds along the "No" path to block 220.

Continuing the illustrated embodiment, the shell or downstream command determines that CSV-to-XML converter 122 of FIG. 1 is available. The converter is then invoked at block 218. Its output of converted data is sent to the downstream command (pause printer command 120 of FIG. 1).

In some cases the information in the encoded portion of the upstream command's output may be useful to accurately and/or efficiently convert the output. The preamble, as set forth above, may comprise this additional information. The converter may use this information to convert the data into a form acceptable to the next downstream command. When converting data from CSV to XML, for instance, it may be useful to know what data is where and the format of the characters therein. If the XML output is to be arranged by each printer's location, name, state, status, share name, and system name, for instance, the encoded information may be used to arrange the data from the upstream command to fit a particular structure.

The information may also be useful as an aid to parsing the output to locate parts of the upstream command's output, especially in those cases where only a part of the output data is to be passed to the downstream command. In such cases the additional encoded information may enable a more efficient and/or accurate parse of the upstream command's output.

In the ongoing illustration, the upstream command outputs six printers having a system name of "PRINTSRV10". If the downstream command is to receive the share name for the printer, the information in lines two and three of the preamble may be used to more easily find that share name. The second and third lines of the upstream command's encoded output are:

---

ColumnNames:
Location,Name,PrinterState,PrinterStatus,ShareName,
SystemName
ColumnTypes:
String,String,int,int,String,String

---

The converter may then, based on this encoding, determine that the fifth column comprises the desired share name and that the characters of that column will be a string.

If operation of the command line is complete, as is the case in the illustrated embodiment, the process ends. If the downstream command's output is to be used by another, further-downstream command, the process may repeat, or process 300 may be followed.

Returning to process 200, in cases where no converter is available, the downstream command (with or without the command-line interface or command-line shell) produces an error message at block 220 indicating that a converter is needed to complete the command line entered by the user. This message may, in some cases, indicate a place on the internet where the converter may be downloaded.

Encoding and Conversion Protocol; Conversion Internally Invoked

In some instances a user may wish to invoke a converter within the command line itself. By so doing some of the acts of process 200 may be skipped.

In one embodiment, a command line is received with the following syntax:

---

$ GET  -PRINTER  -SystemName PRINTSRV10  -
OutputFormat CSV | CONVERT  -CSV-TO-XML | PAUSE -
PRINTER

---

Here the output of the upstream command is CSV, though in this case the user requested that the output be in CSV. The command downstream of the upstream command is "CONVERT-CSV-TO-XML", which is shown in FIG. 1 at 122.

In this process the user chooses the converter, and so likely knows that the final downstream command (pause printer 120) accepts XML data. Here the shell operates to pass the output of the upstream command in CSV to the converter 122 as input in CSV. The shell may then pass the output of the downstream converter to the pause printer command 120 as input in XML.

As before, the information in the encoded portion of the upstream command's data stream may be useful to the converter in converting the output. In this and other cases, a sometimes difficult and often error-prone parsing of TEXT-formatted output may be avoided by choosing to output data in a structured format (like CSV).

Enabling Command Line Operation Automatically Through Detection/Direction

Process 300 enables operation of a command line having an upstream command and a downstream command. It may enable the command line's operation through automatic detection and direction of a data type capable of being output by the upstream command that is acceptable to the downstream command. This may be performed, in some cases, without encoding the upstream command's output. The process 300 is illustrated as a series of blocks representing individual operations or acts performed by elements of the computing device, such as command-line shell 110 and converters 114.

At block 302, the process receives a command line. This command line may be received from a user and may be similarly structured to that described as part of block 202 of FIG. 2.

At block 304, command-line shell 110 determines types of data that may be output by an upstream command. In an illustrated embodiment the command line received is:

```
$ GET  -PRINTER  -SystemName PRINTSRV10 |
  CONFIGURE-PRINTER
```

Get printer command 116, as set forth in the description related to FIG. 1, is capable of accepting and outputting data in TEXT and CSV types. The command-line shell determines this at block 304.

At block 306, the shell determines the input data types acceptable to the downstream command. Continuing the illustrated embodiment, the shell determines that configure printer command 118 is capable of accepting and outputting CSV and XML data types.

At block 308, the shell determines if any of the output types of the upstream command are a type acceptable as input to the downstream command. If so, the shell follows the "Yes" path to block 310. If not, the shell follows the "No" path to block 312.

At block 310, the shell directs the upstream command to output data in a format readable by the downstream command. By so doing, the shell may automatically enable operation of a command line where the output of an upstream command may not be readable by a downstream command. If the upstream command of get printer outputs TEXT-formatted data by default, for instance, the shell will have enabled operation of the command line where it otherwise may have failed.

In the illustrated embodiment, the shell alters the command line from the one received to instead be:

```
$ GET  -PRINTER   -SystemName PRINTSRV10   -
  OutputFormat CSV | CONFIGURE-PRINTER
```

At block 312, the shell directs the upstream command to output data in a format convertible to a format readable by the downstream command.

Assume that the command line received at block 302 is instead:

```
$ GET  -PRINTER   -SystemName PRINTSRV10   |
  PAUSE-PRINTER
```

Returning to blocks 304, 306, and 308, the shell in this embodiment determines that none of the upstream command's outputs may be of a data type acceptable to the downstream command. As set forth above, get printer command 116 is capable of outputting data in TEXT or CSV format and pause printer command 120 is capable of accepting data in ASN.1 or XML format.

At block 312 then, the shell directs the upstream command to output data in a format convertible to a format readable by the downstream command. Based on the availability of converter CSV-to-XML 122 shown in FIG. 1, the shell directs the upstream command to output data in CSV.

The shell invokes the appropriate converter at block 314. Continuing the illustrated embodiment, the shell invokes the CSV-to-XML converter to convert the CSV output to XML. The shell (or another application) may do so without altering the command line or may instead alter the command line, such by changing it to:

```
$ GET   -PRINTER    -SystemName PRINTSRV10   -
  OutputFormat CSV | CONVERT    -CSV-TO-XML | PAUSE -
  PRINTER
```

In an alternative embodiment, the output of the upstream command is encoded to enable the CSV-to-XML conversion to operate with a potentially higher degree of accuracy and/or the output to more easily or accurately be parsed. This encoding may be performed in any of the manners described above.

At block 316, the downstream command is executed. In the illustrated embodiments, the printer is found and paused or found and configured.

The acts of process 200 or 300 or their alternatives may be performed multiple times. Assume that a command line is received having the following commands:

```
$ A | B | C | D | E
```

Here the commands are A, B, C, D, and E. Command A is upstream to command B, B is upstream to C, and so forth. The tools may enable operation of the command line, such as a desired result of executing command E with the preceding data generated from A through D. The tools may do so even in a situation where: A defaults an output type not acceptable to B but where the tools direct A to output the data in a type that is acceptable to B; B outputs a type convertible to a type acceptable to C where the tools invoke an encoding of the output of B and convert that output and send it to C; C outputs by default a type readable by D; and D outputs a type to E that is convertible to a type readable by E but where no encoding of the output of D is performed. This example is given to show the flexibility of the tools. The number and complexity of the commands in a command line may be nearly arbitrary and the command line may still operate using the tools set forth herein.

CONCLUSION

The systems and/or methods described above may be used to enable operation of a command line having an upstream command and a downstream command where the upstream command outputs data of a type unacceptable as input to the downstream command. These systems and/or methods may do so through an encoding and conversion protocol or through a process whereby data types output from the upstream command are automatically detected and directed to be of a type acceptable to the downstream command.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   detecting one or more data types capable of being output by an upstream command in a command line;
   determining whether the detected one or more data types capable of being output by an upstream command line is acceptable as input to a downstream command of the command line;
   in response to determining that the detected one of the one or more data types capable of being output is one that is acceptable as input to the downstream command, directing the upstream command to output data of that data type; and
   in response to determining that the detected one of the one or more data types capable of being output is not one that is acceptable as input to the downstream command, identifying a converter to convert the output to a data type acceptable as input to the downstream command and directing the converter to convert the output to the data type acceptable as input to the downstream command.

2. A method as recited in claim 1, further comprising:
   receiving, from a second upstream command in the command line, second data having a second data type that may or may not be acceptable to a second downstream command in the command line;
   determining whether the second data type is acceptable to the second downstream command; and
   in an event that the second data type is not acceptable to the second downstream command, processing the second data to convert the second data into a data type that is acceptable to the second downstream command.

3. A method comprising:
   detecting one or more data types capable of being output by an upstream command in a command line;
   determining whether the detected one or more data types capable of being output by an upstream command line is acceptable as input to a downstream command of the command line;
   in response to determining that the detected one of the one or more data types is not acceptable as input to the downstream command of the command line, identifying if a converter to convert the output to a data type acceptable as input to the downstream command is available;
   in response to identifying an available converter, converting the output to the data type acceptable as input to the downstream command; and
   in response to not identifying an available converter, outputting an error message indicating a new converter is needed.

4. The method of claim 3, wherein the act of detecting is performed by the command-line shell of the downstream command.

5. The method of claim 3, wherein the act of determining is performed by a command-line shell.

6. The method of claim 3, further comprising performing the acts again for another data stream and another command in the same command line.

7. The method of claim 3, wherein in response to not finding an available converter, outputting an error message indicating a place on the internet where the new convert may be downloaded form.

8. A method comprising:
   detecting one or more data types capable of being output by an upstream command in a command line;
   determining whether the detected one or more data types capable of being output by an upstream command line is acceptable as input to a downstream command of the command line;
   in response to determining that the detected one of the one or more data types capable of being output is one that is acceptable as input to the downstream command, directing the upstream command to output data of that data type;
   in response to determining that the detected one or more data types capable of being output by an upstream command line is not acceptable as input to the downstream command of the command line, invoking a converter to convert data output by the upstream command from one of the one or more data types capable of being output by the upstream command to one of the one or more data types that is acceptable as input to the downstream command of the command line if the converter is available and outputting an error message if the converter is not available; and
   wherein the acts of detecting the one or more data types capable of being output by the upstream command and directing the upstream command are performed by a command-line shell.

* * * * *